March 4, 1952 B. FOX 2,587,718
MODULATION SYSTEM AND METHOD
Original Filed June 30, 1942
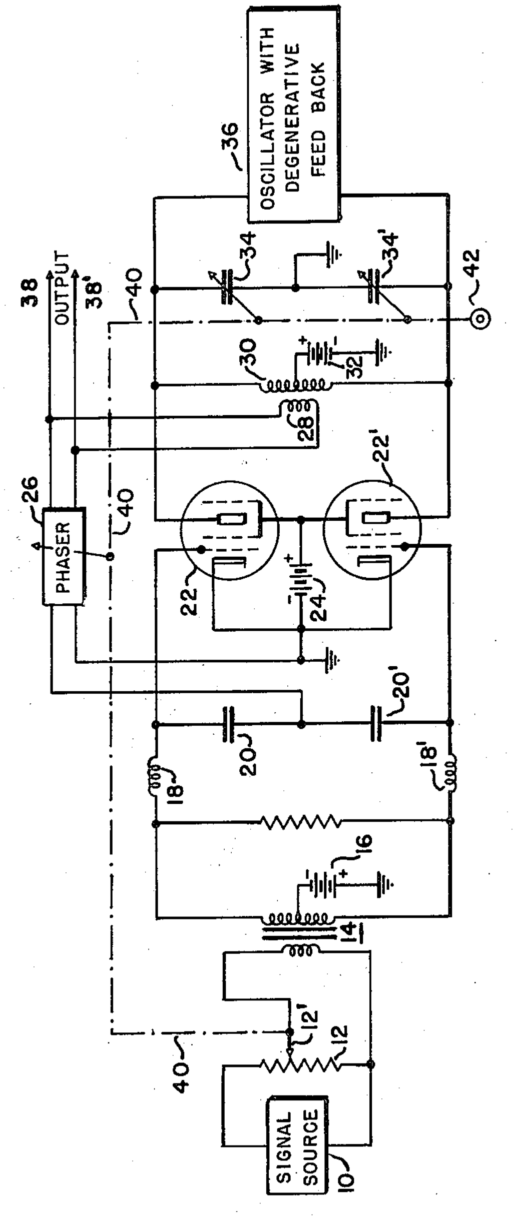
MODULATOR
*INVENTOR.*
BENJAMIN. FOX
*BY* Moore and Hall
ATTORNEYS Patented Mar. 4, 1952 2,587,718

UNITED STATES PATENT OFFICE 2,587,718

MODULATION SYSTEM AND METHOD

Benjamin Fox, New York, N. Y.

Original application June 30, 1942, Serial No. 449,121. Divided and this aplication April 24, 1951, Serial No. 222,727

28 Claims. (Cl. 332—19)

(Granted under the act of March 3, 1883, as amended April 30, 1928; 370 O. G. 757)

The invention described herein, if patented, may be manufactured and used by or for the Government for governmental purposes without the payment to me of any royalty thereon.

This application is a division of my application Serial No. 449,121, filed June 30, 1942.

My invention relates to modulation systems and methods, particularly for circuits having parameters which are adjustable over a relatively wide range. It is particularly applicable to timing modulation systems, i. e., systems in which a time characteristic of an oscillating current is varied. Commonly known systems of this type are frequency modulation systems and phase modulation systems, or hybrids of these two types of modulation.

In modulating an energy characteristic in a circuit, some parameter of the circuit is caused to vary at a periodic rate or in accordance with a modulating signal. The amount of modulation of said characteristic depends upon the ratio of change of said parameter due to modulation relative to the average value of said parameter. If said average value is made adjustable over a wide range, then this ratio will vary over a wide range, and hence the amount of modulation of the energy in said circuit will vary. For example, in one type of frequency modulation system, modulation is produced by means of a signal-responsive reactance connected in the frequency determining circuit of an oscillator to produce a frequency modulation of the oscillations therein. If the operating frequency of said frequency determining circuit is made variable, then the frequency deviation caused by a given amount of reactance variation will vary as the average frequency to which the frequency determining circuit is tuned is varied.

It is an object of my invention to a new and improved method and system for rendering more uniform the modulation produced by a given signal in circuits such as above described. Another object of my invention is to provide a new and improved frequency modulation system for tunable oscillation generators, in which any desired relationship can be obtained between the amount of frequency deviation due to modulation and the average frequency to which said generator is tuned. A further object of my invention is to provide a new and improved frequency modulation system for tunable oscillation generators in which the amount of frequency deviation due to modulation is made substantially constant regardless of the average frequency to which said generator is tuned, in other words, the frequency deviation is made independent of the average frequency.

It is another object of my invention to provide a desired modulation characteristic in a circuit having adjustable impedance and which is modulated by variation of said impedance, by varying the amplitude of the modulating signal simultaneously with the adjustment of said impedance.

Another object of my invention is to provide a desired modulation characteristic in a modulated oscillation generator which is tunable to different average frequencies, e.g., constant frequency deviation, by varying the modulating signal potential applied to the modulating element as the average frequency is varied.

It is a further object of my invention to provide a desired modulation characteristic, such as a more uniform amount of timing modulation or a more uniform amount of frequency deviation, in a signal generator which is tunable to different frequencies, by varying the range of mutual conductance variation produced by a given modulating signal applied to the modulating tube simultaneously with a change in the frequency to which said signal generator is tuned.

It is another object of my invention to provide a desired modulation characteristic, such as more uniform frequency deviation of a modulated signal, in a tunable signal generator which is modulated by means of a quadrature reactance tube circuit coupled to the tunable frequency-determining circuit of said signal generator, by varying the amount of reactance variation injected into said frequency-determining circuit in response to a given signal potential as said frequency-determining circuit is tuned to different frequencies.

In a preferred embodiment of my invention, as applied to a frequency-modulated oscillator which is tunable to different average frequencies by means of an adjustable impedance in the resonant tank circuit thereof, frequency modulation is produced by means of a quadrature reactance tube, the space current path of which is coupled to said tank circuit so that it is excited by a potential which is in phase with the potential across said tank circuit. A control electrode of said tube is excited by a 90° phase-shifted potential from said tank circuit, and the mutual conductance of said tube is varied by means of a modulating signal. Such a circuit will inject reactance into the tank circuit, the magnitude of said reactance being dependent on the amplitude of the oscillator potentials applied to the tube electrodes and mutual conductance of the tube, which is, in turn, dependent upon the amplitude of the modulating signal potential. A control is provided for altering the range of variation of the reactance injected into the tank circuit in response to a given modulating signal, as said tank-circuit impedance is varied. Preferably, said control takes the form of a potentiometer unicontrolled with said tank-circuit impedance to vary the modulation signal amplitude as said tank circuit is tuned to different frequencies, so as to provide a substantially constant amount of frequency deviation produced by a given modulating signal as said tank circuit is tuned to different average frequencies. In this manner a modulation characteristic which is substantially independent of the carrier frequency can be produced.

The features of my invention, which I believe to be novel, are set forth with particularity in the appended claims. My invention itself, however, together with further objects and advantages thereof may best be understood by reference to the following description taken in connection with the accompanying drawing, which shows a schematic circuit diagram of a tunable frequency-modulated oscillation generator embodying a preferred form of my invention.

In the drawing there is shown a radio-frequency oscillation generator in the form of a self-excited oscillator 36 having a resonant frequency-determining network including an inductance coil 30 and two series-connected condensers 34 and 34' of equal capacity connected across said inductance coil to form a parallel resonant tank circuit. A coil 28 coupled to coil 30 is connected to output leads 38 and 38', which may be connected to a utilization circuit. Such utilization circuit may, if necessary or desirable, include means for amplifying and/or frequency multiplying the output of the oscillation generator, and an antenna or other type of radiator if it is desired to transmit signals through a wave-transmitting medium. To tune the oscillator to any one of a range of frequencies, any frequency-determining parameter may be varied. In this case, condensers 34 and 34' are made variable and are tied together to a common tuning control shaft 42 which is operated to vary the average frequency (also termed the mean or center or carrier frequency).

Connected effectively in parallel with the frequency-determining circuit is a frequency-modulating circuit in the form of a signal-responsive reactance circuit for varying a frequency-determining parameter of the resonant circuit in accordance with a signal, thereby modulating the frequency of the oscillator output in accordance with said signal. Said signal is derived from a source of signal potential 10 and applied through an amplitude-varying potentiometer 12 to said reactance circuit. The signal potential is usually in the audio frequency region.

For a given amount of reactance variation developed by the signal-responsive reactance circuit, the absolute frequency-modulation band width, i. e., the number of cycles of frequency deviation from the average frequency to which the oscillator is tuned, will be dependent upon the magnitude of this average frequency. For the reasons above discussed, it will be seen that a change in the average frequency will produce a change in the frequency deviation produced by a given signal potential applied to the reactance tube circuit. In a parallel resonant circuit as above described, there will be an increase in the amount of frequency deviation produced by a given signal potential with increase of said average frequency.

In accordance with my invention, the amount of frequency deviation produced by a given signal from source 10 is automatically controlled, as the average frequency of the oscillator is changed, by means of potentiometer 12, the movable arm 12' of which is ganged for unicontrol with tuning shaft 42, as indicated by the dot-dash line 40. Preferably, the potentiometer so varies the signal voltage applied to the modulating circuit that the frequency deviation produced by a given signal potential from source 10 is maintained substantially constant as the average frequency is changed. Thus, if the frequency deviation of the oscillator 36 produced by a given potential from source 10 normally increases with increase in average frequency, the arm 12' of the potentiometer will be moved in such direction as to proportionately decrease the signal potential applied to the reactance circuit, whereby the amount of reactance variation will be decreased to such an extent as to maintain the amount of frequency deviation substantially constant at any average frequency to which the oscillator is tuned. Obviously, any other desired relationship between frequency deviation and average frequency can be obtained in this manner.

Any type of oscillator and modulation circuit may be used. The specific example of oscillator and reactance tube modulator disclosed herein is conventional and has been described by J. F. Morrison in his Patent No. 2,250,104 and in his article in the October 1950 issue of "Proceedings of the Institute of Radio Engineers," pp. 444–449. Oscillator 36 is of the push-pull type and has in it a negative feedback circuit responsive to modulation signal frequencies to reduce undesirable amplitude modulation components which may be incident to the frequency modulation process, and thus keep the amplitude of the oscillator output substantially constant. The center of coil 30 of the resonant tank circuit is grounded, as is the junction between capacitors 34 and 34' to provide a balanced tank circuit for the oscillator.

The frequency modulating reactance tube circuit is of the balanced, push-pull type and preferably comprises a pair of vacuum tubes 22 and 22' of the screen grid type. The plates of the tubes are connected in push-pull across the terminals of the tank circuit inductance 30, and the control grids of said tubes are connected in push-pull to the modulation voltage transformer 14, the primary of which is connected to signal source 10 through potentiometer 12. A negative bias voltage for the grids is provided by a source of potential 16 which is connected to the midpoint of the secondary winding of transformer 14. A source of potential 24 applies a positive bias to the screen grids, and a source of potential 32, connected between ground and the center point of coil 30, provides plate potential for the tubes. The modulation signal input circuit includes also a resistor, connected across the transformer secondary, radio frequency choke coils 18 and 18', and radio frequency by-pass condensers 20 and 20'. A coupling between the oscillator tank circuit and the control grids of the reactance tubes is provdied by means of coil 28, which is loosely coupled to the tank circuit coil 30 of the oscillator, and is connected through a 90° phase shifting network 26 to the cathodes of the reactance tubes and the midpoint connection of condensers 20 and 21. The phase shifting circuit 26 includes a reactive element which is adjusted to produce between the cathodes and grids of both tubes a radio frequency voltage exactly in quadrature with the voltage across the oscillator coil 30.

Signal source 10 may be of any conventional type. It may be an audio frequency oscillator which may operate at a fixed or variable frequency, or it may provide a complex intelligence signal such as is derived by talking into a microphone. It may include signal frequency amplifiers and have the usual means for adjusting the amplitude or any other characteristic of the signal. It may also include a preemphasizing filter to augment the high frequency components of a complex signal potential, as is common in many communication systems.

Radio frequency choke coils 18 and 18′ have a low impedance to the signal frequency potentials derived from the secondary of transformer 14, but are of high impedance to radio frequency currents, thereby isolating the oscillator currents from the signal frequency circuits. Radio frequency by-pass condensers 20 and 20′ are of low impedance to the oscillator currents but of high impedance to the modulation signal frequencies.

Since the anodes of tubes 22 and 22′ are connected to opposite ends of inductor 30, they are excited 180° out of phase by the oscillator potential. The phase shifter 26 causes the voltage applied to both grids in parallel to lag the voltage applied to the anode of one tube by 90° and to lead the voltage applied to the anode of the other tube by 90°. Therefore at least a portion of the space current of the two tubes will respectively lead and lag the potential across coil 30, and hence the two tubes respectively simulate reactances of opposite sign effectively in parallel with said coil. In the absence of any modulation voltage, the two tubes are in balance, and the reactances produced thereby are equal and opposite and hence neutralize each other, whereby the net reactance produced is normally zero.

Variation of the potential on the control grid of each tube varies the mutual conductance of said tube and thus the amount of reactive current produced thereby. The signal voltage applied to the control grids in opposite phase varies the effective reactances produced by the respective tubes in opposite senses, and hence the overall frequency modulating effect of said tubes is cumulative.

The reactance tubes are normally balanced when their radio frequency grid voltages are exactly 90° phase displaced relative to the radio frequency voltages applied to the anodes. If the elements of the phase shifter 26 were fixed, such 90° phase shift would be obtained at only a single frequency. If the oscillator tank circuit is tunable to widely spaced frequencies, the phase of the voltage applied to the grids would depart a great deal from the required 90° phase relation, with the result that considerable amplitude modulation effects would be produced. In addition, the tubes would be in varying degrees of unbalance over most of the tuning range of the oscillator.

One of the features of my invention is to provide a means to maintain said balance throughout the tuning range of the oscillator. To this end, phase shifter 26 has a variable reactance element therein which is ganged for unicontrol with the tuning shaft 42 to maintain the phase shift at 90° at any frequency to which the oscillator is tuned. This maintains at zero the net reactance injected into the tank circuit by the tubes, in the absence of modulation potential, throughout the frequency range of the oscillator.

With a reactance tube circuit of this type, the frequency modulating effect of a given signal potential is roughly directly proportional to the average frequency of the oscillator. To maintain the frequency deviation constant, the potentiometer arm 12′ is moved so as to proportionately reduce the signal voltage applied to the control grids of the reactance tubes as the average frequency is increased. By thus varying the range of variation of the mutual conductance of the tubes produced by a given signal from source 10, the frequency deviation produced by said signal can be maintained more uniform or substantially constant through all or any desired portion of the tuning range of the oscillator. It will be obvious that in this manner any desired relationship between average frequency and the amount of frequency deviation can be provided.

The publications cited above are to be considered a part of this disclosure insofar as they disclose specific forms which any of the components herein described or their equivalents may take.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. A frequency modulation signal generator comprising means for producing a signal of audio frequency, means for producing a signal of radio frequency, means for modulating the frequency of said radio frequency signal with said audio frequency signal, means for varying the frequency of said radio frequency signal, and means for maintaining the frequency deviation of said frequency modulated signal constant throughout the range of variation of the frequency of said radio frequency signal.

2. A frequency modulation signal generator comprising means for producing a signal of audio frequency, means for producing a signal of radio frequency, means for modulating the frequency of said radio frequency signal with said audio frequency signal, means for varying the frequency of said radio frequency signal, and means for maintaining the frequency deviation of said frequency modulated signal constant throughout the range of variation of the frequency of said radio frequency signal, said means comprising means for varying the amplitude of the audio frequency signal in proportion to the frequency of the radio frequency signal.

3. A frequency modulation signal generator comprising a source of audio oscillations, a radio oscillator, means for modulating the frequency of said radio oscillator with said audio oscillations, means for varying the frequency of said radio oscillator, and means for varying the amplitude of said audio oscillations, said frequency varying and amplitude varying means being unicontrolled.

4. A frequency modulation signal generator comprising a source of signal oscillations, first control means for varying the amplitude of said oscillations, a source of radio oscillations, means for modulating the frequency of said radio oscillations with said signal oscillations, and second control means for varying the frequency of said radio oscillations, said first and second control means being ganged for unicontrol.

5. In a radio transmitter, the combination of a source of oscillations, means for modulating a characteristic of said oscillations, means for controlling the amount of said modulation, means for varying the average frequency of said oscillations, said controlling means being mechanically connected with said frequency varying means for simultaneous adjustment therewith to maintain the amount of said modulation substantially constant as said average frequency is varied over a substantial range.

6. In a radio transmitter, the combination of a source of oscillations including a resonant frequency determining circuit, means for modulating the frequency of said oscillations comprising a reactance circuit connected in shunt with said resonant circuit, said reactance circuit including a variable impedance, adjustable means for varying the frequency of said resonant circuit, and means interconnecting said frequency varying means and said impedance for simultaneously varying the impedance of said reactance circuit as said frequency varying means is adjusted thereby to maintain the amount of modulation substantially constant as said frequency varies over a substantial range.

7. In combination, a source of oscillations including a resonant frequency determining circuit, means for varying the average frequency of said oscillations, means for frequency-modulating said oscillations comprising a reactance circuit connected with said frequency determining circuit, means for varying the apparent reactance of said reactance circuit presented to said frequency determining circuit, and means interconnecting said frequency varying means and said reactance varying means for maintaining the amount of frequency modulation substantially constant as said average frequency is varied over a substantial range.

8. A frequency modulated transmitting system comprising a source of oscillations including a resonant frequency determining circuit, means for varying the average frequency of said oscillations, means for frequency modulating said oscillations comprising an electron discharge device having an anode connected with said resonant circuit, a cathode, and a control electrode, a reactance coupled between said control electrode and said anode, means for connecting modulating signals between said control electrode and said cathode, means for varying the intensity of said signals, and means for simultaneously adjusting said intensity varying means as said frequency varying means is adjusted, said intensity varying means and said frequency varying means being so proportioned that the amount of frequency modulation caused by said modulating means is maintained substantially constant as said average frequency is varied over a substantial range.

9. In a frequency-modulated oscillation generator, a resonant circuit, means exciting said circuit into oscillation, signal-responsive means for frequency modulating the oscillations in said circuit as a function of the amplitude of a signal applied thereto, a first control means to change the resonant frequency of said circuit, a second control means to change the amplitude of the signal applied to said signal-responsive means, and means to render more uniform the frequency deviation produced by a given signal as said resonant frequency is changed, said last means comprising common means for simultaneously operating said first and second control means.

10. A modulated oscillation generator comprising a frequency-determining network, means for changing the output frequency of said generator, a timing modulation circuit for said generator comprising an electron tube having an input electrode and an output electrode, means coupling said network to said output electrode for impressing thereon an oscillating potential from said network with substantially no phase-shift, means between said network and input electrode for impressing thereon an oscillating potential from said network at least a portion of which is in quadrature with the oscillating potential impressed on said output electrode whereby at least a portion of the space current produced in said tube is in quadrature with the potential impressed on said output electrode by said network, means adapted to be coupled to a source of modulation signals for impressing a modulating signal potential upon an electrode of said tube for controlling the amplitude of said quadrature current, and auxiliary means ganged for unicontrol with said output-frequency-changing means for reducing the variation of a desired timing modulation characteristic as said output frequency is changed, said auxiliary means comprising adjustable means for changing the amplitude of the quadrature current produced by any signal potential from said source.

11. A generator as set forth in claim 10, wherein said auxiliary means comprises adjustable means for changing the amplitude of one of said potentials.

12. A frequency modulated signal generator comprising a source of oscillations including a resonant frequency determining network; a frequency modulating circuit for said oscillations comprising a pair of electron discharge reactance tubes each having at least a cathode, an anode electrode and a grid electrode, coupling means for impressing in push-pull upon the anode electrodes of said tubes oscillating potentials from said resonant network, coupling means including phase-shifting means for impressing oscillating potentials from said resonant circuit upon the grid electrodes of said tubes substantially in phase-quadrature with the potentials impressed upon said anode electrodes, whereby at least a portion of the space current in said tubes is in quadrature with the oscillating potential impressed on the anode electrodes, means for impressing modulating signal potentials upon like electrodes of said tubes to vary said quadrature current, and means for controlling the amplitude of said signal potentials; means for changing the average frequency of said oscillations; and means, comprising unicontrol means for simultaneously adjusting said amplitude controlling means and said average frequency changing means, for reducing variations in the amount of frequency deviation caused by said modulating circuit in response to a given signal potential as said average frequency is changed.

13. The invention set forth in claim 12, wherein said phase shifting means comprises an adjustable element operated by said unicontrol means to maintain the phase shift constant.

14. A modulated signal generator comprising a source of oscillations including a resonant circuit; balanced means for modulating the oscillations in said resonant circuit comprising a pair of electron discharge reactance tubes each having at least a cathode electrode, an anode electrode and a grid electrode, coupling means for impressing in push-pull upon one set of like electrodes of said tubes the oscillating potential in said resonant circuit; coupling means for impressing said oscillating potential in parallel upon a second set of like electrodes of said tubes, phase shifting means in one of said coupling means whereby at least a portion of the potential impressed upon said one set of like electrodes is substantially in phase-quadrature with the potential impressed upon said second set of like electrodes, means responsive to a modulating signal potential for varying the mutual conductances of said tubes in opposite senses in accordance with said modulating signal potential, and means for controlling the amplitude of said modulating signal potential; means for varying the average frequency of said oscillations; and means, comprising unicontrol means for simultaneously adjusting said amplitude controlling means and said frequency varying means, for providing a predetermined relationship between the modulating effect of said modulating network in response to a given signal potential and said average frequency.

15. A modulation system for a resonant circuit having control means for changing the resonant frequency thereof, comprising means for injecting positive and negative reactances effectively in parallel with said resonant circuit, modulating means to simultaneously vary said reactances in opposite senses, first adjustable means linked with said control means to maintain said reactances normally equal as said resonant frequency is changed, there being normally a variation in a modulation characteristic with change in said resonant frequency, and second adjustable means linked with said control means for maintaining said modulation characteristic substantially constant as said resonant frequency is changed.

16. A system as set forth in claim 15, wherein said reactances comprise a pair of electron discharge reactance tubes coupled to said circuit each having an electrode excited by a potential from said resonant circuit having a 90° phase displacement relative to the potential at a point on said resonant circuit, and wherein said first adjustable means maintains said phase-displacement constant as said resonant frequency is changed.

17. In combination, a resonant circuit having adjustable control means for changing the resonant frequency thereof, timing modulating means normally having a constant magnitude at all values of said resonant frequency for injecting reactance into said resonant circuit, means coupled to said modulating means to periodically vary the reactance injected thereby, the amount of timing modulation normally varying with change in said resonant frequency, and adjustable means linked with said control means for maintaining said amount of timing modulation substantially constant as said frequency is changed.

18. In a frequency modulation system, a tunable resonant network comprising parallel-connected reactance circuits of opposite sign, means to produce frequency modulation of the energy in said network comprising means to periodically vary the reactance of one sign, first adjustable means to vary the reactance of only the other sign to change the average frequency of said energy, second adjustable means to vary the amount of reactance variation produced by said frequency modulation means, and means to maintain substantially constant the amount of frequency deviation of said energy due to modulation as said average frequency is changed, said last-named means comprising unicontrol means for simultaneously adjusting said first and second adjustable means.

19. In combination, a source of oscillations, first means operable to change a time characteristic of said oscillations, means for modulating the timing of said oscillations comprising an electron discharge device the mutual conductance of which is varied as a function of a signal applied to said device, means for applying signals to said device from a source of signals, second means operable to change the extent of variation of said mutual conductance produced by any signal from said source, and unicontrol means for simultaneously controlling the operation of said first and second operable means to produce a change in said extent of variation as said characteristic is changed.

20. In combination, a source of carrier frequency oscillations, first control means for changing said carrier frequency, means adapted to be connected to a source of signals for timing modulating said oscillations in accordance with a signal comprising an electron discharge device the mutual conductance of which is varied in accordance with the amplitude of said signal, the modulating effect of said modulating means varying with change in said carrier frequency, second control means for changing the extent of variation of said mutual conductance produced by any signal from said source, and means for maintaining the modulating effect of said modulating means more uniform as said carrier frequency is changed, the last-named means comprising unicontrol means for operating said first and second control means.

21. In a modulated oscillation generating system, an output circuit, means for supplying oscillations to said output circuit, means responsive to modulating energy for timing modulating said oscillations, first means operable to vary the average frequency of said oscillations, second means operable to vary the amplitude of said modulating energy, and unicontrol means for simultaneously controlling the operation of said first and second operable means to produce a change in the amplitude of said modulating energy as said average frequency is changed.

22. In a frequency modulated oscillation generating system: a source of oscillations; means responsive to modulating energy applied thereto for frequency modulating said oscillations; an adjustable element in said source to change the average frequency of said oscillations; adjusting means for adjusting said element; and means for obtaining a desired relationship between the amount of frequency deviation and said average frequency; the last-named means comprising amplitude controlling means, responsive to the operation of said adjusting means, for changing the amplitude of said modulating energy by an amount which is related to the amount of change in said average frequency produced by said adjusting means.

23. A frequency modulated oscillation generator comprising a frequency-determining network; a frequency modulation circuit for said network comprising an electron tube having an input electrode and an output electrode, means coupling said network to said output electrode for impressing thereon an oscillating potential from said network with substantially no phase-shift, means between said network and input electrode for impressing thereon an oscillating potential from said network at least a portion of which is in quadrature with the oscillating potential impressed on said output electrode whereby at least a portion of the space current produced in said tube is in quadrature with the potential impressed on said output electrode by said network, means for impressing a modulating signal potential from a source of signals upon an electrode of said tube for controlling the amplitude of said quadrature current, and auxiliary means for varying the amplitude of said quadrature current produced by any signal from said source; tuning means for tuning the average frequency of said network to at least two values; and means for maintaining substantially constant the amount of frequency deviation produced by a given signal from said source in the region of said two average frequency values, said last-named means comprising unicontrol means for simultaneously operating said tuning means and said auxiliary means.

24. The method of generating a frequency modulated signal, comprising generating a carrier wave the frequency of which is variable, frequency modulating said wave with a signal, and maintaining the amount of frequency deviation due to modulation substantially independent of the frequency of said carrier wave, the last-named step comprising changing the amplitude of said signal simultaneously with a change in said frequency.

25. The method of generating a timing modulated signal, comprising generating a carrier wave the frequency of which is variable, timing modulating said wave with a signal, and maintaining a desired modulation characteristic substantially independent of the frequency of said carrier wave, the last-named step comprising changing the amplitude of said signal simultaneously with a change in said frequency.

26. A modulated oscillation generator comprising a frequency-determining network; control means for changing the operating frequency of said network; a modulation circuit for timing modulating the output of said network comprising at least one electron tube having an input electrode and an output electrode, means coupling said network to one of said electrodes for impressing thereon an oscillating potential from said network with substantially no phase-shift;

means, including a phase shifter having a constant phase shift at all operating frequencies of said network, coupled between said network and the other of said electrodes for impressing thereon an oscillating potential from said network at least a portion of which is in quadrature with the oscillating potential impressed on said output electrode, whereby at least a portion of the space current produced in said tube is in quadrature with the oscillating potential impressed on said one electrode; means for impressing a modulating signal potential upon an electrode of said tube for controlling the amplitude of said quadrature current, there being a variation in the amount of timing modulation produced by a given signal from said source as said operating frequency is changed; and means linked with said control means for substantially eliminating said variation.

27. In an electrical circuit, modulating means responsive to periodically varying energy applied thereto for producing similar periodic variations in the magnitude of an impedance in said circuit, first means operable to change the average magnitude of said impedance, second means operable to vary the maximum amplitude of the energy applied to said modulating means, and unicontrol means for simultaneously controlling the operation of said first and second operable means to produce a change in said maximum amplitude as said average magnitude is changed.

28. The method of generating a frequency modulated signal, comprising generating a carrier wave the frequency of which is variable, frequency modulating said wave with a signal, and maintaining a desired frequency modulation characteristic substantially independent of the variation of the frequency of said carrier wave, the last-named step comprising varying the amplitude of said signal simultaneously with the variation of said carrier wave frequency.

BENJAMIN FOX.

REFERENCES CITED

The following references are of record in the file of this patent:

UNITED STATES PATENTS

| Number | Name | Date |
|---|---|---|
| 1,445,929 | Baker | Feb. 20, 1923 |
| 1,897,767 | Roberts | Feb. 14, 1933 |
| 2,296,962 | Tunick | Sept. 29, 1942 |
| 2,337,533 | Barber | Dec. 28, 1943 |
| 2,342,708 | Usselman | Feb. 29, 1944 |